(12) United States Patent
Ota

(10) Patent No.: US 8,191,731 B2
(45) Date of Patent: Jun. 5, 2012

(54) APPARATUS FOR FEEDING SCREWS

(75) Inventor: Yoshitake Ota, Iwate (JP)

(73) Assignee: Ohtake Root Kogyo Co., Ltd., Iwate (JP)

( * ) Notice: Subject to any disclaimer, the term of this patent is extended or adjusted under 35 U.S.C. 154(b) by 343 days.

(21) Appl. No.: 12/648,786

(22) Filed: Dec. 29, 2009

(65) Prior Publication Data

US 2010/0206694 A1    Aug. 19, 2010

(30) Foreign Application Priority Data

Feb. 13, 2009    (JP) ................................. 2009-031894
May 22, 2009    (JP) ................................. 2009-124373

(51) Int. Cl.
*G07F 11/16*    (2006.01)

(52) U.S. Cl. ........ 221/254; 221/165; 221/168; 221/179; 221/182

(58) Field of Classification Search ................... 221/167, 221/168, 182, 179, 165, 254
See application file for complete search history.

(56) References Cited

U.S. PATENT DOCUMENTS

| | | | | |
|---|---|---|---|---|
| 2,025,273 A | * | 12/1935 | Dellaree | 221/169 |
| 3,863,802 A | * | 2/1975 | Daniels | 221/175 |
| 4,101,054 A | * | 7/1978 | Frost et al. | 221/278 |
| 5,234,127 A | * | 8/1993 | Singer et al. | 221/165 |
| 5,392,954 A | * | 2/1995 | Gartz | 221/262 |
| 5,529,208 A | * | 6/1996 | Carstens et al. | 221/254 |
| 5,857,587 A | * | 1/1999 | Ota | 221/254 |

FOREIGN PATENT DOCUMENTS

| | | |
|---|---|---|
| JP | 9-58847 | 3/1997 |
| JP | 2001-287827 | 10/2001 |

* cited by examiner

*Primary Examiner* — Timothy Waggoner
(74) *Attorney, Agent, or Firm* — Dilworth & Barrese, LLP.

(57) ABSTRACT

The present invention provides an apparatus for feeding screws. In the apparatus, screws are scooped up from the storage container by a scooping unit and put onto a carrying unit. The screws are arranged in line and carried by the carrying unit and discharged through a discharge unit. The scooping unit includes a rotating arm which rotates on the outer wall of the storage container, and a magnet which is fastened to the front end of the rotating arm. The carrying unit includes a screw receiving part. The rotating arm rotates on the outer wall of the storage container to scoop up the screws using magnetic force of the magnet and load the screws onto the screw receiving part. The scooping unit further includes a magnet spacing part which is provided on the outer wall of the storage container. The magnet spacing part moves the magnet of the rotating arm away from the outer wall of the storage container, so that when the magnet is moved away from the outer wall of the storage container at the upper portion of the storage container, the attractive force of the magnet to the screws is reduced, thus dropping the screws onto the screw receiving part of the carrying unit.

18 Claims, 11 Drawing Sheets

(a)

(b)

(a)

(b)

(a)

(b)

APPARATUS FOR FEEDING SCREWS

BACKGROUND OF THE INVENTION

1. Field of the Invention

The present invention relates to an apparatus for feeding screws or the like, for example, metal rivets or tacks, having head parts and cylindrical shank parts (screwed parts) in such a way as to place the screws in a container, arrange them in lines, and discharge them one after another.

2. Description of the Related Art

A representative example of conventional apparatuses for feeding screws or the like was proposed in [Patent document 1] which was filed by the applicant of the present invention and entitled 'Screw feeder'. The conventional screw feeder includes a storage container which stores a large number of screws S therein, and a guide rail which is provided in the storage container and extends to the outside of the storage container. The guide rail has an insert rail groove into which the screws S are inserted, and guides the screws S to discharge them in order. Furthermore, the screw feeder further includes a feeding unit which feeds screws S from the storage container onto the rail. The screws S fed onto the rail are moved along the rail and are stopped and arranged in line on a discharge side end of the rail by a stopper.

The feeding unit which feeds the screws S onto the rail includes a board which moves upwards and downwards to lift screws S and put them onto the rail. However, in the conventional technique, because there is a limit to the capacity of the board, many of the screws S which have been in the storage container are not loaded on the board. In other words, even if the size of the storage container is increased, the number of screws which can be loaded on the board is restricted.

Furthermore, because a relatively large number of screws are dropped from the board onto the rail at one time, the screws overlap with each other so that they cannot be satisfactorily arranged in line, with the result that several screws S are discharged at once. That is, the reliability of the operation is low.

In an effort to overcome the above-mentioned problems experienced with the conventional screw feeder, a parts feeding apparatus was proposed in [Patent document 2]. In this technique, a movable plate reciprocates on the outer surface of a storage container which contains metal parts. A magnet is mounted to the movable plate. A scraper is provided at a predetermined position in the storage container. Thus, a small amount of metal parts are scooped up from the storage container using the magnetic force of the magnet. The scraper scrapes the metal parts off the magnet. Thereafter, the metal parts are discharged to the outside one by one. However, although this apparatus can feed parts one by one, because the movable plate reciprocates, the apparatus is complicated and abrasion of the elements is increased. Furthermore, since the metal parts are separated from the magnet in such a manner that the scraper scrapes the metal parts off the magnet, the metal parts may be easily damaged. Thus, various kinds of transporting members or receiving members are required.

[Patent document 1] Japanese Patent Laid-open Publication No. Heisei. 9-58847

[Patent document 2] Japanese Patent Laid-open Publication No. 2001-287827

SUMMARY OF THE INVENTION

Accordingly, the present invention has been made keeping in mind the above problems occurring in the prior art, and an object of the present invention is to provide an apparatus for feeding screws which is constructed such that the capacity of a storage container for containing screws therein can be increased to reduce the frequency with which screws are supplied into the storage container, and the screws can be reliably arranged in line and discharged one by one.

In order to accomplish the above object, the present invention provides an apparatus for feeding screws, including: a storage container containing the screws therein; a scooping unit scooping up the screws from a lower part of the storage container; a carrying unit receiving the screws scooped up by the scooping unit and carrying the screws; and a discharge unit discharging the screws carried by the carrying unit to an outside. The discharge unit is installed ahead of the storage container. The scooping unit includes: a rotating arm rotating on an outer wall of the storage container; and a magnet fastened to a front end of the rotating arm. The carrying unit comprises a screw receiving part, wherein the rotating arm rotates on the outer wall of the storage container from a lower portion thereof to an upper portion thereof to scoop up the screws contained in the storage container using an attractive magnetic force of the magnet and loads the screws onto the screw receiving part of the carrying unit. The scooping unit further includes a magnet spacing part provided on the outer wall of the storage container. The magnet spacing part moves the magnet of the rotating arm away from the outer wall of the storage container, so that when the magnet is moved away from the outer wall of the storage container at the upper portion of the storage container, the attractive force of the magnet to the screws is reduced, thus dropping the screws onto the screw receiving part of the carrying unit.

The scooping unit may be provided on a sidewall of the storage container which is parallel to a direction in which the screws are being carried by the carrying unit.

Alternatively, the scooping unit may be provided on a rear wall of the storage container which is perpendicular to a direction in which the screws are being carried by the carrying unit.

The carrying unit may comprise a guide rail unit. The guide rail unit may include a rail and an inertial force applying unit. The rail guides the screws from an inside of the storage container to the outside thereof. The rail has therein an insert rail groove into which shank parts of the screws are inserted such that head parts of the screws are supported on inner edges of the rail that define the insert rail groove therebetween. The inertial force applying unit vibrates the rail forwards and backwards to apply inertial force to the screws inserted into the insert rail groove in the direction in which the screws are discharged.

Alternatively, the carrying unit may comprise a parallel roller unit. The parallel roller unit may include a pair of rollers provided parallel to each other, the rollers rotating in opposite directions, with spiral grooves respectively formed in the rollers. The spiral grooves may extend in directions opposite to each other such that when the rollers rotate. The spiral grooves may move on upper surfaces of the rollers in appearance in the direction in which the screws are discharged, so that the rollers guide the screws, head parts or ends of which are inserted into the spiral grooves, from an inside of the storage container to the outside thereof.

The magnetic spacing part may include a magnet guide roller which is installed on the rotating arm, and a magnet guide rail. The magnet guide rail may comprise an arc-shaped thick block part, inclined parts, and a depressed part, so that when the guide roller moves on the depressed part, the magnet of the rotating arm attracts the screws using magnetic force, and when the guide roller moves onto thick block part via the corresponding inclined part, the magnet is moved outwards away from the outer wall of the storage container to remove the screws from the magnet.

According to the present invention, a magnet of a scooping unit is provided on an outer wall of a storage container, so that screws are scooped up from the lower part of the storage container by the magnetic force of the magnet which rotates. Therefore, the depth of the storage container can be increased, thus increasing the capacity with which screws are contained in the storage container. Because the amount of screws contained in the storage container is increased, the frequency with which screws are supplied into the storage container can be reduced.

Furthermore, the magnet scoops up an appropriate amount of screws from the lower part of the storage container. The screws that are scooped up are dropped onto a screw receiving part of the carrying unit by moving the magnet away from the outer wall of the storage container above the carrying unit. Therefore, in the conventional technique which is operated in such a manner as to reciprocate the magnet, because the reciprocating unit easily gets worn, much time is required to maintain and repair the reciprocating unit. However, in the present invention, because the movement of the magnet is realized in a rotating manner, it can be smoothly operated and the probability of malfunction of the apparatus can be markedly reduced. In addition, in the conventional technique, because a scraper is used to separate screws from the magnet, excessive force may be applied to the screws, resulting in damage to the screws. As well, the scraper is also easily worn. Thus, replacement or repair of the scraper is frequently required. However, in the present invention, the operation of dropping screws on the carrying unit can be smoothly conducted in such a way as to move the magnet away from the outer wall of the storage container and eliminate the magnetic force applied to the screws. Hence, the screws can be smoothly dropped onto the carrying unit without applying external force to the screws. Thus, the screws can be prevented from becoming damaged, and the apparatus can also be prevented from becoming worn.

Furthermore, the scooping unit may be provided on a sidewall of the storage container. In this case, the depth of the storage container can be increased.

Alternatively, the scooping unit may be provided on a rear wall of the storage container. In this case, the width of the storage container can be increased. Thus, the entire size of the apparatus can be reduced. As well, screws can be uniformly supplied onto the carrying unit despite a simple mechanism being used.

Meanwhile, in the present invention, a guide rail unit may be used as the carrying unit for carrying the screws. In this case, the guide rail unit has a vibrating structure, so that screws can be rapidly and reliably fed.

Alternatively, rollers carrying in parallel and having spiral grooves may be used as the carrying unit for carrying the screws. In this case, the present invention can be used as an apparatus for feeding parts which can rapidly and reliably feed not only small screws but also large screws or the like.

Furthermore, in the present invention, a magnet guide rail for guiding a guide roller of the magnet includes an arc-shaped thick block part, inclined parts, and a depressed part forming a depression. Thus, the magnet guide rail can smoothly guide the magnet. Hence, abrasion of the components can be prevented. In addition, the screws can be smoothly scooped up by the magnet and smoothly removed from the magnet. As a result, the screws can be rapidly and reliably supplied onto the carrying unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

In the present invention, a magnet is provided on an outer wall of a storage container so as to be rotatable. The magnet rotates on the outer wall of the storage container and thus scoops up an appropriate amount of screws from a lower part of the storage container using the magnetic force. When the magnet is disposed above a carrying unit while the magnet rotates, the magnet is moved away from the outer wall of the storage container, thus dropping the screws onto a screw receiving part of a guide rail unit (first embodiment) of the carrying unit, a guide plate (second embodiment) or a parallel roller unit (third embodiment). Therefore, the present invention can prevent screws from being damaged and reduce abrasion of components of the apparatus. In addition, the present invention is constructed such that screws are scooped up from the lower part of the storage container by the magnetic force of the magnet. Thus, the depth of the storage container can be increased, so that the capacity with which screws are contained in the storage container can be increased.

First Embodiment

Hereinafter, an apparatus for feeding screws according to a first embodiment of the present invention will be described in detail with reference to the attached drawings.

Figure 1:
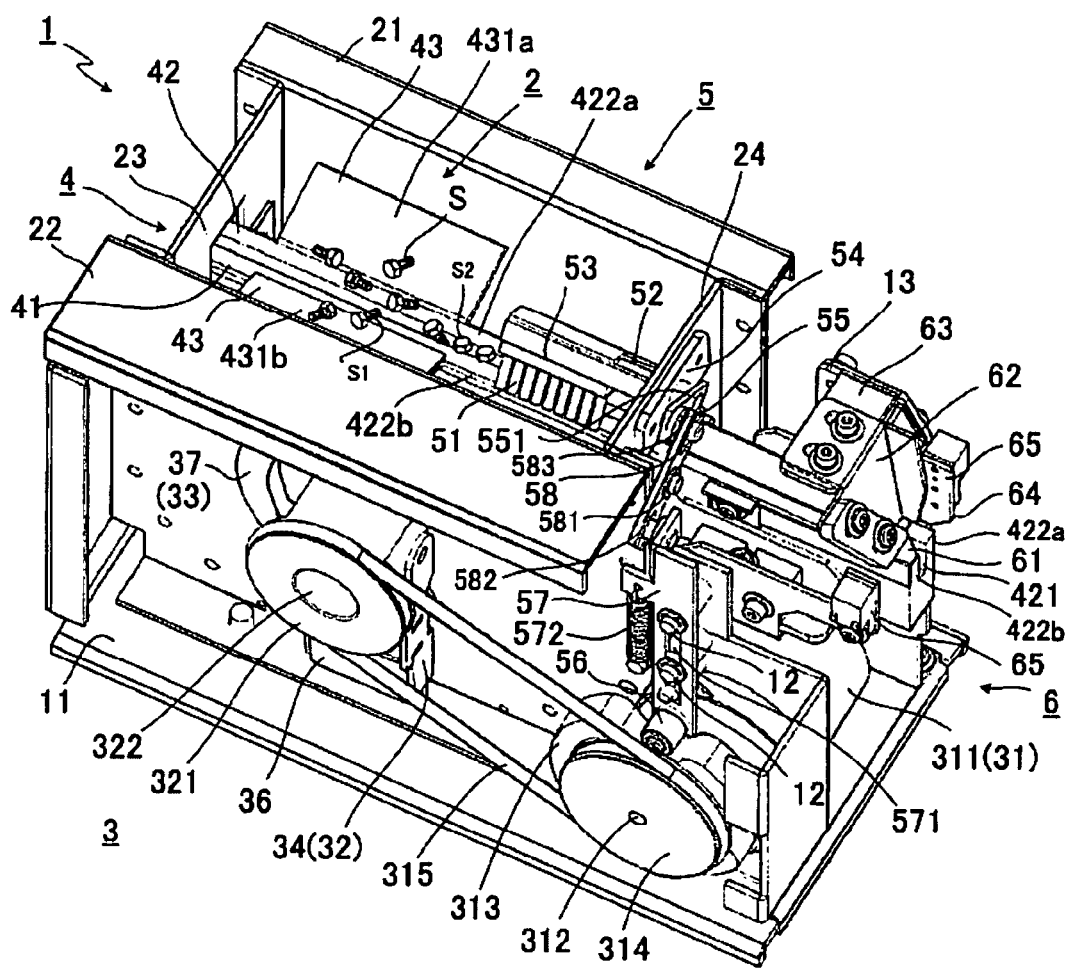
FIG. 1 is a perspective view illustrating an apparatus for feeding screws, according to a first embodiment of the present invention.

As shown in FIG. 1, in the screw feeding apparatus 1 according to the first embodiment of the present invention, a storage container 2 which receives screws S and occupies most of the volume of the screw feeding apparatus 1 is disposed at the left side of FIG. 1. A scooping unit 3 is provided on the outside surface of the storage container 2 to scoop up screws S from the lower part of the storage container 2. The scooping unit 3 loads the screws S on a carrying unit (4, a guide rail unit) which is provided in the storage container 2. The loaded screws S are transported by the guide rail unit 4 which has an inertial force applying unit. Furthermore, the screws S which are being transported by the guide rail unit 4 are arranged in line by a brush rotating unit 5. A discharge unit 6 discharges the screws S to the outside in regular order to feed the screws S to a desired place.

Below, the construction of the screw feeding apparatus 1 will be described in more detail.

[Storage Container 2]

First, the storage container 2 will be explained with reference to FIGS. 1, 3 and 7. The storage container 2 is installed on a base 11 of the screw feeding apparatus 1. The storage container 2 has a right plate 21 and a left plate 22 at the right and left sides based on the front side. Furthermore, a rear plate 23 is provided on the rear side of the storage container 2. A front plate 24 is provided on the front side of the storage container 2. Thus, the storage container 2 is formed in the shape of a rectangular box. The lower part 25 of the storage container 2 includes three (front/rear/left) inclined plates 251a, 251b and 251c which are inclined towards the central portion of the rectangular bottom of the storage container 2. The lower part 25 further includes a planar bottom plate 252 which is provided on the center of the three inclined plates 251a, 251b and 251c. Thus, the lower part 25 of the storage container 2 forms a hopper shape.

To use the screw feeding apparatus 1, a user inputs an appropriate amount of screws S into the open upper end of the storage container 2. Most of the input screws S are received in the lower part 25 of the storage container 2. The storage container 2 includes a front scooping chamber section 26 in which screws S which are in the front side of the storage container 2 are scooped up, and a rear scooping chamber section 27 which contains a screw receiving part 43 which receives screws S dropped into the rear side of the storage container 2. Furthermore, the guide rail unit 4 which will be explained in detail later is installed in the storage container 2 and extends from the rear plate 23 to the front plate 24. The discharge unit 6 is provided on the front surface of the front plate 24 of the storage container 2. The scooping unit 3 is installed on the left plate 22.

In the storage container 2 of the screw feeding apparatus of the present invention, as described below, because screws S are scooped up from the lower part of the storage container 2 using the magnetic force of a magnet which rotates, the depth of the storage container 2 can be increased, thus increasing the capacity with which screws S are contained in the storage container 2.

[Scooping Unit 3]

As shown in FIGS. 1, 2, 4 and 5, the critical elements of the scooping unit 3 are disposed on the outer surface of the left plate 22 of the storage container 2. The scooping unit 3 includes a drive unit 31 which rotates a magnet rotating unit 32 in one direction (in a counterclockwise direction of FIG. 2). A drive motor 311 is provided on the front surface of the front plate 24 of the storage container 2. An output shaft 312 of the drive motor 311 protrudes from the left plate 22 in the lateral direction. A rotary cam 313 and a pulley are provided on the output shaft 312. A drive belt 315 is wrapped over the pulley 314 of the output shaft 312 and a pulley 321 of the magnet rotating unit 32.

The pulley 321 is integrally provided on a first end of a rotating shaft 322 of the magnet rotating unit 32. A second end of the rotating shaft 322 is rotatably supported by a bearing 323 (refer to FIGS. 3 and 5). The bearing 323 is provided on the left plate 22 of the storage container 2. As shown in FIG. 4, a magnet mounting arm 34 and an arm support 35 which supports the magnet mounting arm 34 are installed between the bearing 323 and the pulley 321. The arm support has opposite planar parts 352 which are formed in a circumferential part 351 thereof, in detail, are formed by cutting off diametrically opposite portions of the circumferential part 351. Two arm bearings 353 are respectively installed in the planar parts 352. The magnet mounting arm 34 has two rotating arm plates 341. Each rotating arm plate 341 has an arm hinge pin 342. The arm hinge pins 342 of the rotating arm plates 341 are rotatably inserted into the corresponding arm bearings 353, so that the magnet mounting arm 34 can be rotatably supported by the arm support 35.

As such, the magnet mounting arm 34 is mounted to the arm support 35 through the arm hinge pins 342 of the rotating arm plates 341 so as to be rotatable around the arm hinge pin 342 in the direction parallel to the rotating shaft 322 of the circumferential part 351 (in other words, the magnet mounting arm 34 is provided so as to be rotatable in the direction in which it is moved away from or is brought into contact with the left plate 22). Furthermore, the magnet 36 is mounted to the distal end of the magnet mounting arm 34. A magnet guide roller 343 is provided between the magnet 36 and the arm hinge pins 342 such that the magnet rotating unit 32 can smoothly rotate around the rotating shaft 322.

Figure 4:
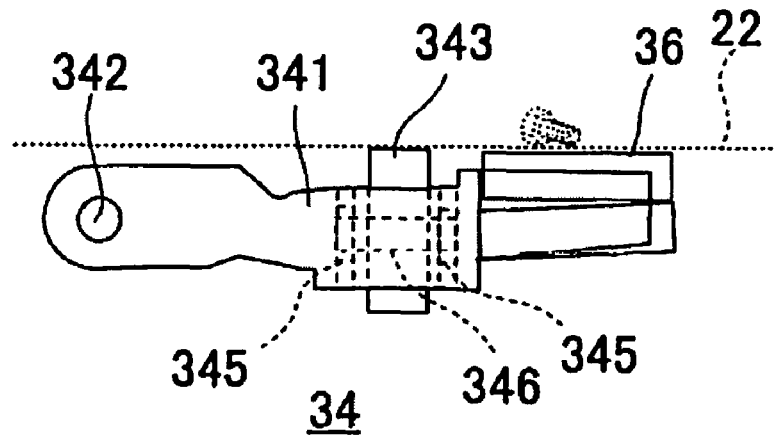
FIG. 4($a$) is a side view of a magnet and a magnet mounting arm of the screw feeding apparatus, and FIG. 4($b$) is a plan view of an assembled arm support.
Figure 4:
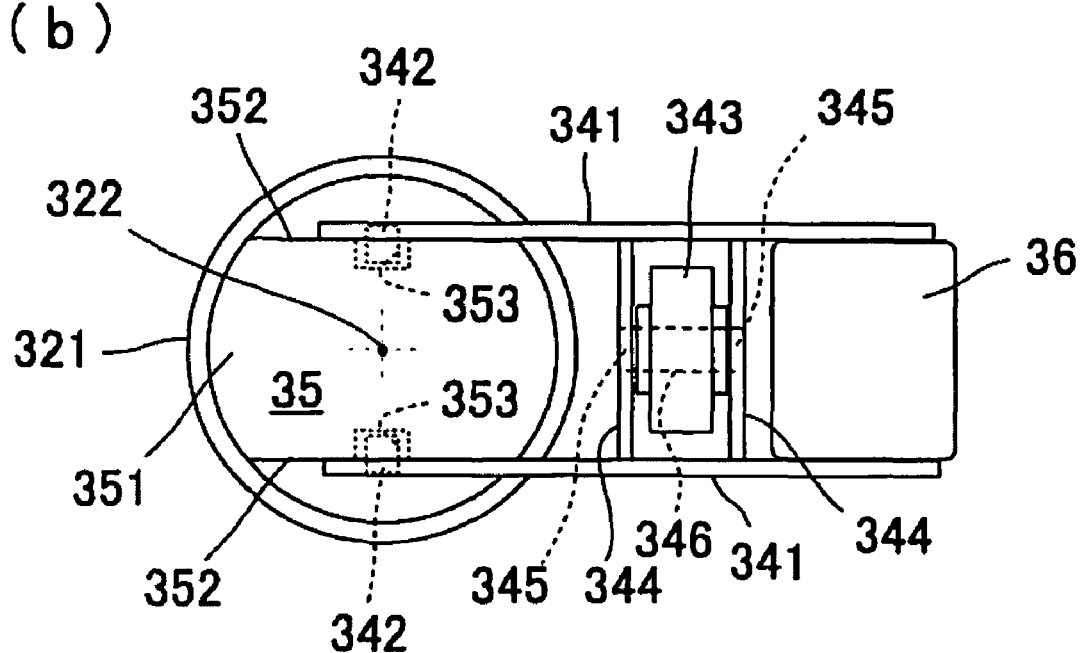
Figure 5:
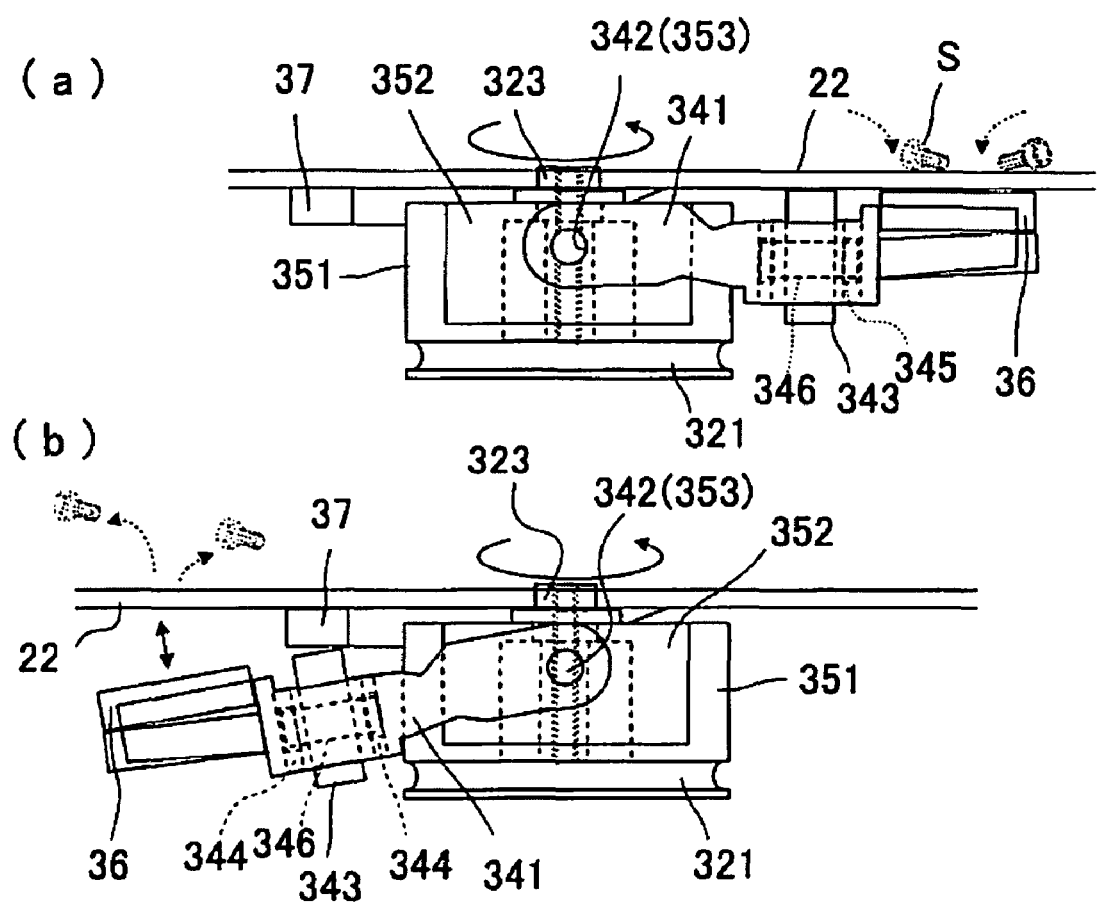
FIG. 5($a$) is a plan view illustrating the application of the magnetic force of a scooping unit to screws, and FIG. 5($b$) is a plan view showing the magnet removed from a left plate such that the magnetic force thereof does not get applied to the screws.

As shown in FIGS. 4 and 5, the magnet guide roller 343 has a roller shaft 346. A pair of roller mounting plates 344 is perpendicularly provided between the rotating arm plates 341. Bearings 345 are respectively provided in the roller mounting plates 344. The roller shaft 346 of the magnet guide roller 343 is rotatably supported by the bearings 345. The magnet guide roller 343 rotates around the rotating shaft 322 along a circular trajectory.

The magnetic force of the magnet 36 attracts the screws S which are made of metal and are in the storage container 2. The screws S that are attracted to the magnet 36 are scooped up by the rotation of the magnet 36. Here, the magnet 36 is provided on the distal end of the magnet mounting arm 34 which rotates, such that the magnetic force thereof can be applied to the screws S in the storage container 2.

Figure 6:
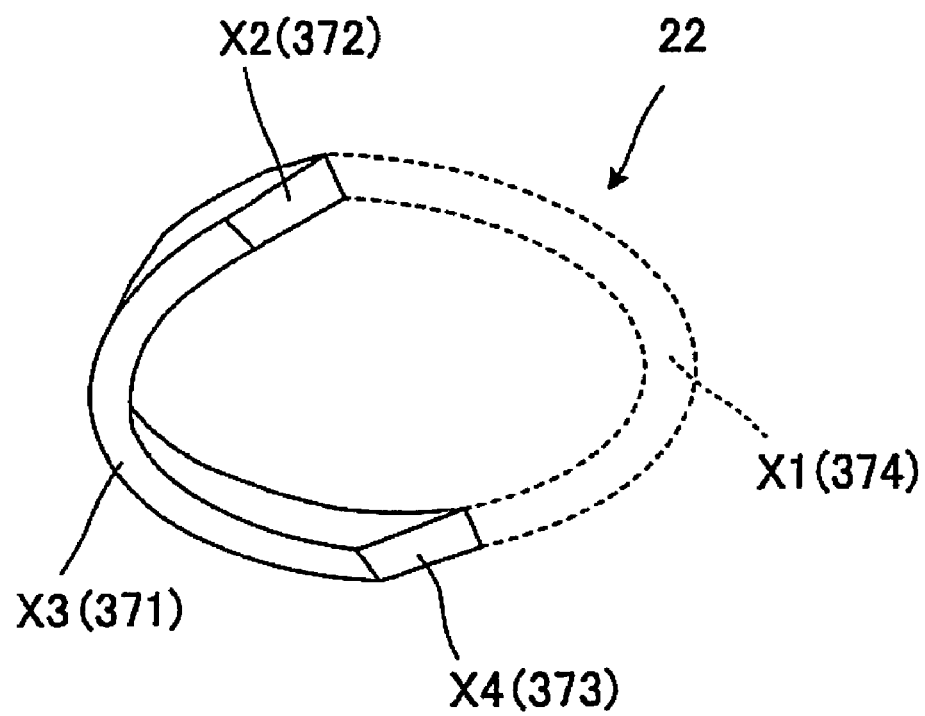
FIG. 6($a$) is a perspective view of a separation rail, and FIG. 6($b$) is a side view of the separation rail.
Figure 6:
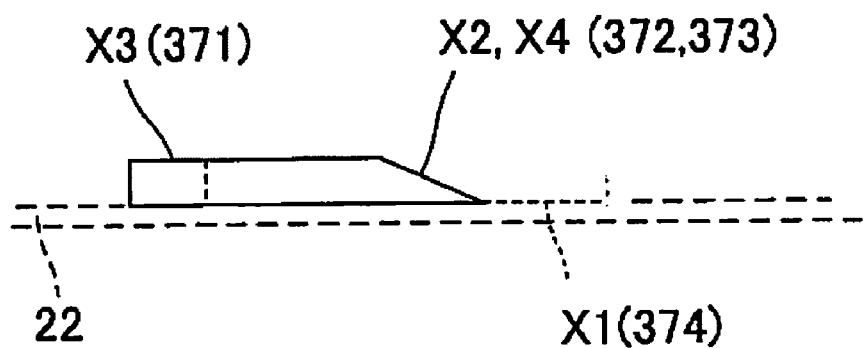

A separation rail 37 is provided on the trajectory along which the magnet guide roller 343 rotates. The separation rail 37 constitutes a magnet spacing part 33 which functions to move the magnet 36 away from the left plate 22. As shown in FIG. 6, the separation rail 37 has a magnetic force application range X1, transition ranges X2 and X4 and a separation range X3. In the embodiment, the magnetic force application range X1 of the separation rail 37 is formed on the surface of the left plate 22. The separation rail 37 includes a planar rail part 371 which has a semicircular shape and forms the separation range X3, and inclined parts 372 and 373 which extend from both ends of the planar rail part 371 and forms the transition ranges X2 and X4. Of course, in consideration of a problem, such as abrasion of the left surface 22, the separation rail 37 may be a circular rail which integrally has a thin planar rail part (depressed part) 374, a thick planar rail part 371 and inclined parts 372 and 373 to form a contiguous structure. In this case, the thin planar rail part 374 defines the magnetic force application range X1.

That is, the magnet spacing part 33 includes the magnet guide roller 343 which are provided on the rotating arm plates 341, and a magnet guide rail which is the separation rail 37 for guiding the magnet guide roller 343. The magnet guide rail forms a circular trajectory. The circular trajectory is defined by a thick block part which is the planar rail part 371 having an arc shape, the inclined parts 372 and 373 and a portion (depressed part) of the outer surface of the left plate 22. When the magnet guide roller 343 moves on the outer surface of the left plate 22, screws S which have been in the lower portion of the rear scooping chamber section 27 are attracted by the magnetic attractive force of the magnet 36 mounted to the rotating arm plates 341 and are moved upwards along with the magnet 36. After the screws S pass through the front scooping chamber section 26 and are scooped up to the upper portion of the rear scooping chamber section 27, when the magnet guide roller 343 moves onto the planar rail part 371 via the inclined part 372, the magnet 36 is moved away from the outer surface of the left plate 22. Then, the attractive force of the magnet 36 with respect to the screws S in the storage container 2 is weakened, so that the screws S are dropped onto the screw receiving part 43 which will be explained later. Thereafter, the magnet guide roller 343 passes through the inclined part 373 and then moves onto the outer surface of the left plate 22 again.

The left plate 22 is made of stainless steel which is a nonmagnetic material. The screws S which are objects to be moved are magnetic substances. Therefore, the magnet 36 always attracts the screws S towards the left plate 22. Furthermore, in the embodiment, although the left plate 22 has been illustrated as being made of nonmagnetic stainless steel, other sidewalls of the storage container may also be made of stainless steel. In addition, the sidewalls of the storage container may be made of another material, as long as it is a nonmagnetic material, for example, glass, synthetic resin, etc.

[Carrying Unit (4, Guide Rail Unit)]

Figure 2:
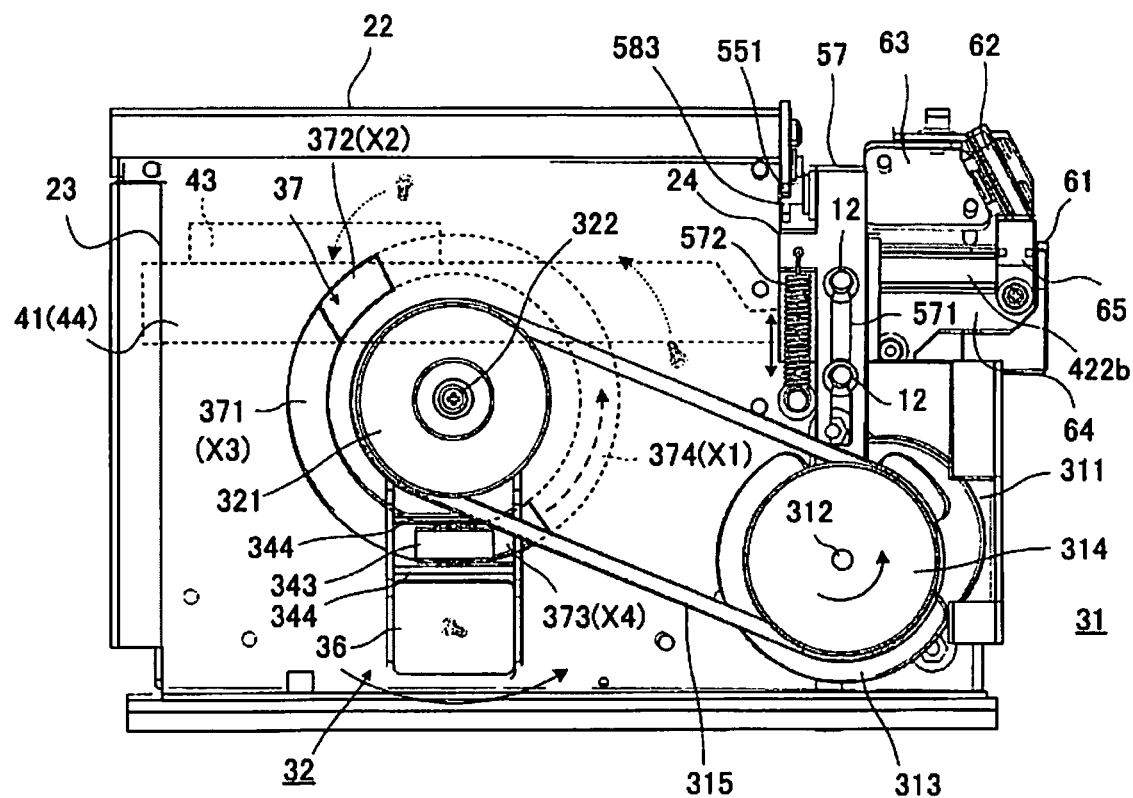
FIG. 2 is a side view illustrating a drive unit of the screw feeding apparatus.

The guide rail unit 4 will be explained with reference to FIGS. 1 through 3 and, particularly, 7 and 8. Basically, the guide rail unit 4 is a feeder using an inertial force applying unit which was disclosed in [Patent document 2] stated above and moves the guide rail unit forwards and backwards to apply inertial force to screws S in the direction in which they are discharged.

Figure 7:
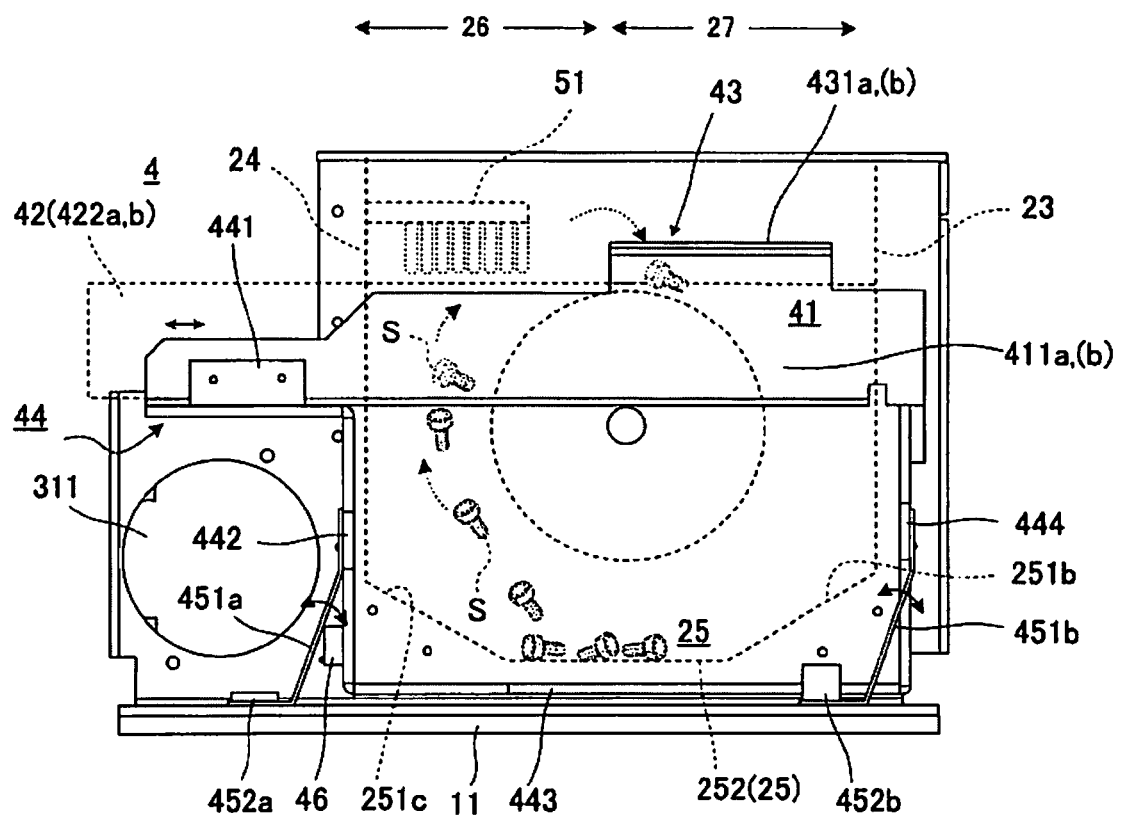
FIG. 7 is a side sectional view illustrating a guide rail unit of a carrying unit of the screw feeding apparatus according to the present invention.

As shown in FIG. 7, a rail support part which includes a rail support 41, and a rail part 42 which is supported by the rail support 41 are almost horizontally installed in the upper portion of the guide rail unit 4. The rail support 41 extends from the rear plate 23 of the storage container 2 to the front plate 24. Moreover, the rail support 41 protrudes from the front plate 24 and extends to the discharge unit 6. As shown in FIG. 1, the rail part 42 has an insert rail groove 421 extending along the longitudinal central axis of the rail part 42. Shank parts (screwed parts, S1) of screws S are inserted into the insert rail groove 421 and are arranged in line. Two rails 422a and 422b are provided on opposite sides of the insert rail groove 421. Furthermore, the screw receiving part 43 is provided on the opposite outer surfaces of the two rails 422a and 422b. The screw receiving part 43 receives screws S dropped downwards from the scooping unit 3 and supplies the screws S into the insert rail groove 421.

In detail, the screw receiving part 43 contiguously extends from rail holding plates 411a and 411b which are provided on an upper surface of a support plate 44 of the rail support 41. As shown in FIG. 1, the screw receiving part 43 includes a pair of receiving wings 431a and 431b which are disposed in the rear scooping chamber section 27 and are contiguous with the upper surface of the rail part 42. The receiving wings 431a and 431b form a "V" shape.

Furthermore, the rail part 42 is removably supported by the rail holding plates 411a and 411b which press the opposite sides of the rail part 42. The rail holding plates 411a and 411b are installed on an upper support plate 441 provided on the upper surface of the support plate 44 of the rail support 41. Depending on the kind of screws to be fed, a rail part 42 including an insert rail groove 421 having a width and a depth corresponding to the screws can be selected and used. Furthermore, when necessary, the rail part 42 can be simply replaced with another one.

As stated above, the rail holding plates 411a and 411b are installed on the upper support plate 441 of the rail support 41 of the guide rail unit 4. The inertial force applying unit which moves the rail part 42 forwards and backwards is provided under the rail support 41. The support plate 44 of the rail support 41 has a "U" shape. In detail, the U-shaped support plate 44 includes a front support plate 442, a bottom plate 443 and a rear support plate 444 which surround the storage container 2. The front and rear ends of the rail support 41 are supported by the front and rear plates 24 and 23 of the storage container 2 through coupling holes (not shown) which are formed through the front and rear plates 24 and 23. Here, preferably, gaps between the rail support 41 and the coupling holes must be smaller than the screws S to prevent the screws S from passing out of the storage container 2 through the gaps and prevent the screws S from being stuck in the gaps.

Furthermore, first ends of plate springs 451a and 451b are respectively coupled to the front support plate 442 and the rear support plate 444 of the support plate 44 of the rail support 41. Fastening parts 452a and 452b of the plate springs 451a and 451b which are second ends of the plate springs 451a and 451b are fastened to the base 11 of the screw feeding apparatus 1. Therefore, the entire guide rail unit 4 is supported only by the plate springs 451a and 451b so as to be movable in the longitudinal direction.

Figure 8:
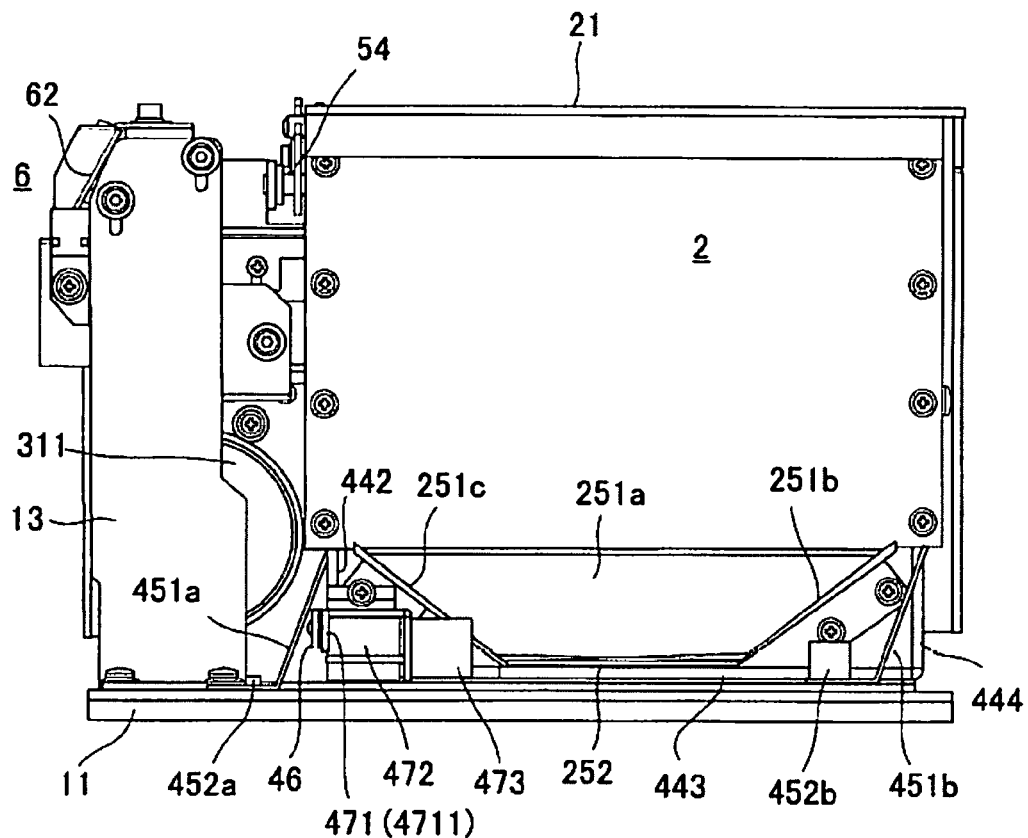
FIG. 8($a$) is a side view showing a vibration unit (an inertial force application unit) of the guide rail unit of the carrying unit, and FIG. 8($b$) is a detailed plan view showing an electromagnet.
Figure 8:
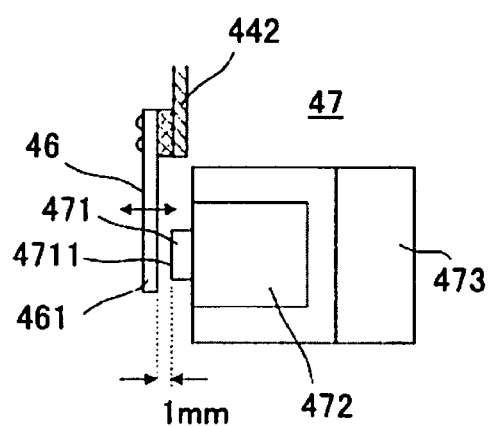

Meanwhile, an electromagnetic receiving plate 46 which is made of magnetic material protrudes from the lower end of the front support plate 442 of the support plate 44 in the lateral direction. As shown in FIGS. 8(a) and 8(b), an iron core 471 of an electromagnet 47 is disposed adjacent to a distal end 461 of the electromagnetic receiving plate 46 protruding from the front support plate 442 such that the iron core 471 faces the side surface of the distal end 461 of the electromagnetic receiving plate 46 at a position spaced apart therefrom by a slight distance. The iron core 471 of the electromagnet 47 is fastened to the base 11.

FIG. 8(b) is a plan view showing in detail the electromagnet 47. The iron core 471 is disposed at the center of an electromagnetic coil 472 of the electromagnet 47. A mounting board 473 is provided on the end of the electromagnet 47 which is opposite to a magnetic force applying surface 4711 of the iron core 471. The mounting board 473 is fastened to the base 11. Furthermore, the location of the guide rail unit is set such that the electromagnetic receiving plate 46 which is mounted to the front support plate 442 and faces the magnetic force applying surface 4711 of the iron core 471 is spaced apart from the magnetic force applying surface 4711 by a distance of about 1 mm.

When the electromagnetic coil 472 is supplied with power and turned on, magnetic force is generated on the magnetic force applying surface 4711 of the iron core 471, so that the electromagnetic receiving plate 46 is attracted to the magnetic force applying surface 4711. Hereby, the entire guide rail unit 4 is moved to the right in FIG. 7. When the supply of power to the electromagnetic coil 472 is interrupted and the electromagnetic coil 472 is turned off, the guide rail unit 4 is returned to its original position by the restoring force of the plate springs 451a and 451b. The electromagnetic receiving plate 46 of the guide rail unit 4 is also returned to its original position at which it is spaced apart from the magnetic force applying surface 4711 by a distance of about 1 mm. As such, the entire guide rail unit 4 is vibrated in the longitudinal direction (forwards and backwards) by applying square waves or A.C. to the electromagnetic coil 472. This mechanism for vibrating the guide rail unit 4 realizes the inertial force applying unit.

In addition, the guide rail unit 4 which is the carrying unit is provided in the storage container 2 as if it were floating in air. Hence, the guide rail unit 4 can be prevented from being interfered with by the screws S in the storage container 2, so that the screws S can be smoothly scooped up by the scooping unit 3.

[Brush Rotating Unit 5]

As described above, shank parts (screwed parts, S1) of screws S which are dropped onto the rails 422a or 422b or the "V"-shaped receiving wings 431a and 431b are inserted into the insert rail groove 421, are arranged in line, and are carried to the outside. However, some screws S may not be correctly inserted into the insert rail groove 421. In other words, some screws S in incorrect positions may be carried by the rails 422a and 422b. In this case, the screws S in incorrect positions must be dropped into the storage container 2 again. The brush rotating unit 5 conducts the function of dropping the screws S in incorrect positions into the storage container 2.

Figure 3:
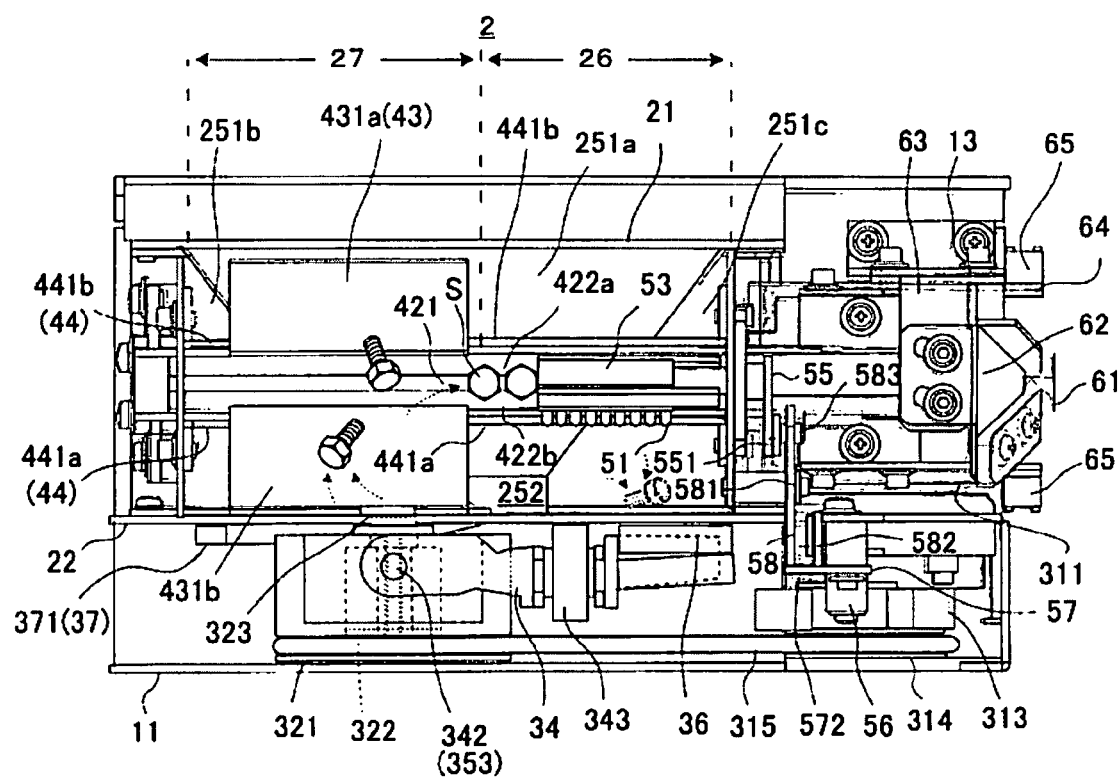
FIG. 3 is a plan view of FIG. 1.

As shown in FIGS. 1 and 3, a brush 51 is disposed above the rails 422a and 422b in the front scooping chamber section 26. The brush 51 sweeps the surface of the rails 422a and 422b leftwards and rightwards. The brush 51 extends flatly a predetermined length in the longitudinal direction of the rails 422a and 422b. The brush 51 is fastened to a rotating shaft 52 by a height adjustment member 53. The rotating shaft 52 passes through a rotating bearing 54 and the front plate 24. A rotary arm 55 is provided on the front end of the rotating shaft 52.

Power source for rotating the rotary arm 55 to the left and the right can be obtained by rotation of the drive motor 311. In this case, the rotary arm 55 is preferably connected to the drive motor 311 through a link mechanism. A pressure contact roller 56 engages with the rotary cam 313 which is provided on the output shaft 312 of the drive motor 311. The rotary cam 313 has a depression in a predetermined portion thereof. The pressure contact roller 56 is provided on a first end of a slider 57 which moves in the vertical direction. The slider 57 is constructed by a combination of a pair of stationary shafts (12, at a base side) and a slot (571, at a slider side). The slider 57 is biased towards the output shaft 312 of the drive motor 311 by a spring 572. Thus, the slider 57 forcibly brings the pressure contact roller 56 into close contact with the cam surface of the rotary cam 313.

Furthermore, a link 58 is rotatably provided at a predetermined position on the front plate 24 through a center link bearing 581. A first link bearing 582 is provided on a first end of the link 58. A second end of the slider 57 is rotatably coupled to the first link bearing 582 of the link 58. In addition, a second link bearing 583 is provided on a second end of the link 58 and is rotatably coupled to a front rotary member 551 which is provided on the front end of the rotary arm 55.

Therefore, when the rotary cam 313 having the depression rotates, the slider 57 and the pressure contact roller 56 which is in close contact with the cam surface of the rotary cam 313 move upwards and downwards. Then, the upward and downward movement of the slider 57 is transmitted to the front rotary member 551 and the rotary arm 55 through the link 58, thus rotating them the left and the right. Thereby, the brush 51 and the rotating shaft 52 which is the central shaft of the rotary arm 55 are reciprocally rotated to the left and the right.

The distance between a brush tip of the brush 51 and the surfaces of the rails 422a and 422b is adjusted by the height adjustment member 53 such that the brush tip is brought into slight contact with head parts S2 of screws S that are correctly inserted into the insert rail groove 421. Here, if the position of the brush 51 is set such that the brush tip is disposed below the head parts of the screws S, when the brush rotates to the left and the right, it may excessively scatter the screws S or it may not be able to rotate. Therefore, it is preferable that the brush 51 be set at the above-mentioned position.

[Discharge Unit 6]

As described above, the scooping unit 3 loads screws S onto the guide rail unit 4. The loaded screws S are carried by the guide rail unit 4 which has the inertial force apply unit using the vibration mechanism. In addition, the screws S are arranged by the brush rotating unit 5 and then discharged in order to the outside through the discharge unit 6. That is, the discharge unit 6 feeds the screws S to the outside. Hereinafter, the discharge unit 6 will be explained in detail with reference to FIGS. 1 and 3.

Referring to FIGS. 1 and 3, a stopper 61 is provided on the front end of the insert rail groove 421 which extends outwards from the front plate 24. Furthermore, a funnel-shaped bit guide 62 is provided above the stopper 61. The bit guide 62 guides an end of a driver such that it can be correctly inserted into a head part S2 of the corresponding screw S. The bit guide 62 is fastened to a bit guide mounting plate 13 through a bit guide bracket 63. The bit guide mounting plate 13 is placed upright on the base 11.

As stated above, in the screw feeding apparatus 1 of the first embodiment, screws S are discharged in order from the storage container 2 to the outside through the guide rail unit 4. When the discharged screws S reach the discharge unit 6 which is provided on the front end of the guide rail unit 4, the movement thereof is stopped by the stopper 61. Furthermore, a front end sensor 65 is mounted to the support plate 44 of the rail support 41 through a sensor bracket 64. When a predetermined time period has passed after the front end sensor 65 detects that a screw S reaches the stopper 61, the entire operation of the screw feeding apparatus 1 is stopped.

After the screw S is disposed at the position of the stopper 61, the bit of the driver is moved downwards under guidance of the bit guide 62. Then, the bit which is guided by the bit guide 62 is coupled to the head part S2 of the screw S. In this state, the screw S is drawn out by pulling the driver forwards. At this time, the front end sensor 65 detects that the screw S is drawn out, so that the drive unit restarts the operation of scooping up screws S in response to the detection of the front end sensor 65.

As described above, the first embodiment of the present invention is operated in such a manner that the screws S are scooped up from the lower portion of the storage container 2 by the magnetic force of the magnet 36 which rotates. Therefore, the depth of the storage container 2 can be increased, thus increasing the capacity with which screws S or the like, for example, metal rivets or tacks, are contained in the storage container 2. Because the amount of screws S contained in the storage container 2 is increased, the frequency with which screws S are input into the storage container can be reduced.

Furthermore, the magnet 36 is provided outside the storage container 2. The magnet 36 scoops up an appropriate amount of screws S from the lower portion of the storage container 2.

The screws S that are scooped up are dropped onto the screw receiving part 43 of the guide rail unit 4 by moving the magnet 36 away from the sidewall 22 of the storage container 2 above the guide rail unit 4. Therefore, in the conventional technique which is operated in such a manner as to reciprocate the magnet, because the reciprocating unit is easily worn, much time is required to maintain and repair the reciprocating unit. However, in the present invention, because the movement of the magnet 36 is realized by rotating, it can be smoothly operated and the probability of malfunction of the apparatus can be markedly reduced. In addition, in the conventional technique, because the scraper is used to remove screws from the magnet, excessive force may be applied to the screws, damaging the screws. As well, the scraper is also easily worn. Thus, replacement or repair of the scraper is frequently required. However, in the present invention, the operation of dropping screws on the guide rail unit 4 can be smoothly conducted in such a way as to move the magnet 36 away from the surface of the left plate 22 and reduce the intensity of the magnetic force applied to the screws. Hence, it is not required to apply a separate external force to the screws S to separate them from the magnet 36. Thus, the screws S can be prevented from becoming damaged, and the apparatus can also be prevented from becoming worn. Moreover, the present invention is provided with the brush rotating unit 5. Therefore, screws S or the like can be easily arranged in line by the brush rotating unit 5, so that the screws S can be discharged one after another.

Second Embodiment

Hereinafter, an apparatus for feeding screws according to a second embodiment of the present invention will be described in detail with reference to the attached drawings.

Figure 9:
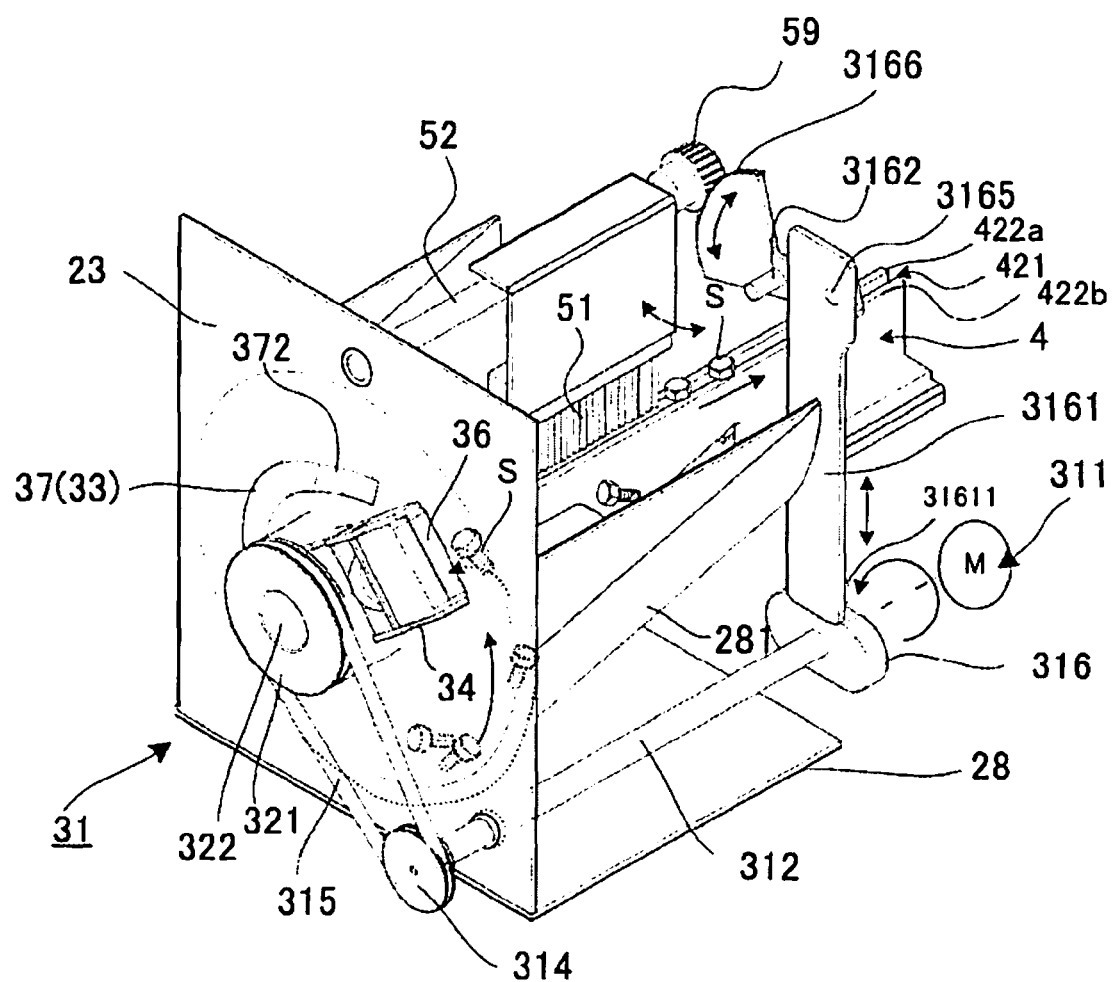
FIG. 9 is a rear perspective view illustrating a critical part of an apparatus for feeding screws, according to a second embodiment of the present invention.
Figure 10:
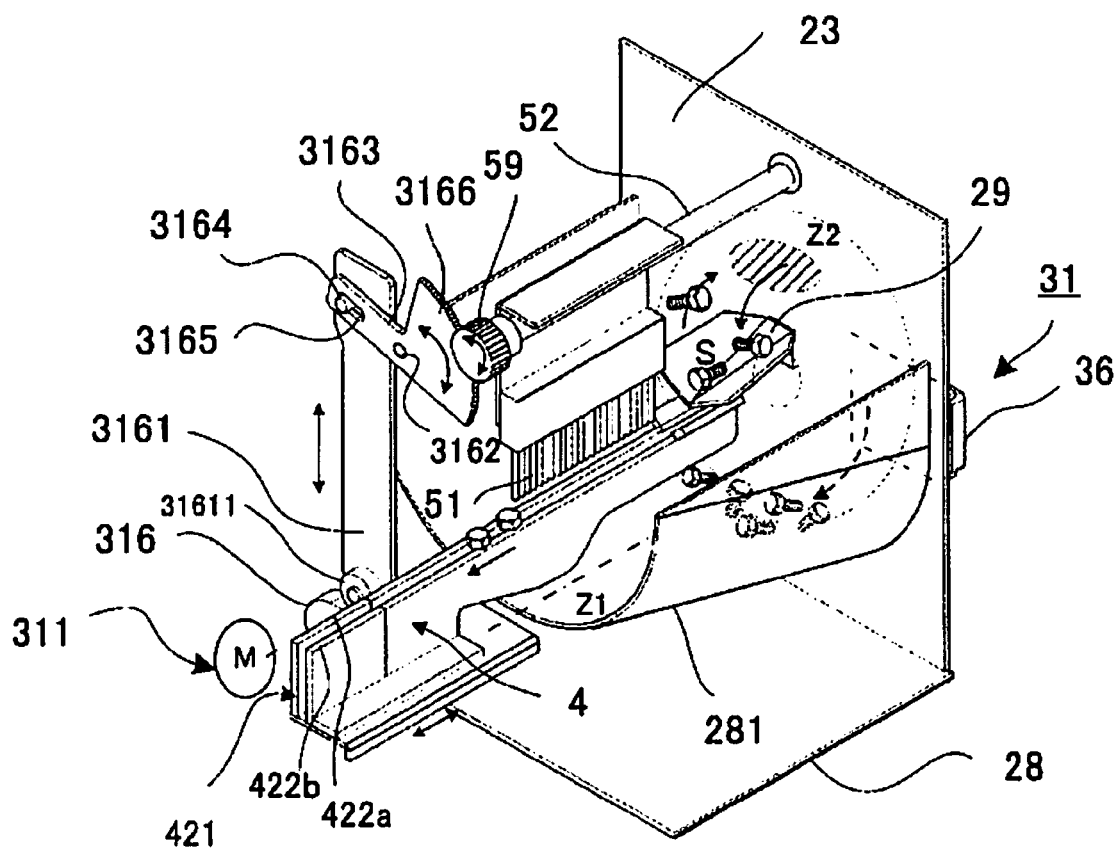
FIG. 10 is a front perspective view of the critical part of FIG. 9.

As illustrated in FIGS. 9 and 10 showing the critical part of the second embodiment, the screw feeding apparatus 1 according to the second embodiment is characterized in that a scooping unit 3 is provided on an outer surface of a rear plate 23 of a storage container 2 rather than on that of a sidewall of the storage container 2, unlike the first embodiment. Below, the construction of the second embodiment will be explained in more detail.

[Storage Container 2]

Although the general structure of a right plate, a left plate and a front plate of the storage container 2 according to the second embodiment are not illustrated in the drawings, they remain the same as those of the first embodiment, therefore detailed descriptions will be omitted. However, a lower part 28 of the storage container 2 of the second embodiment differs from that of the first embodiment. As shown in FIGS. 9 and 10, the lower part 28 of the storage container 2 includes a semi-cylindrical receptacle 281 which is installed in the storage container 2 such that both ends thereof are close to the left and right plates of the storage container 2 and the central portion thereof is disposed at the lowermost position. The lowermost portion (corresponding to a central axis Z1) of the semi-cylindrical receptacle 281 is inclined such that it is lowered from the front plate 24 (refer to FIG. 2) to the rear plate 23. The width of the semi-cylindrical receptacle 281 extends to the left and right plates of the storage container 2.

To use the screw feeding apparatus 1, a user inputs an appropriate amount of screws S into the open upper end of the storage container 2. The input screws S are received in the semi-cylindrical receptacle 281 of the lower part 28 of the storage container 2. Because the semi-cylindrical receptacle 281 is inclined downwards towards the rear plate 23, the screws S gather adjacent to the rear plate 23. Furthermore, in the same manner as the first embodiment, a guide rail unit 4 is installed in the storage container 2 and extends from the rear plate 23 of the storage container 2 to the front plate (equal to the front plate 24 of the first embodiment). In addition, a discharge unit is disposed on the front surface of the front plate of the storage container 2. A scooping unit 3 which will be explained later is installed on the rear plate 23. As well, a guide plate 29 (refer to FIG. 10) is provided at a predetermined position on the inner surface of the rear plate 23. The guide plate 29 temporarily receives screws S dropped from the scooping unit 3 and guides the screws S onto a carrying unit 4.

As described below, the storage container 2 according to the second embodiment is operated in such a way as to scoop up screws S from the lower portion of the rear plate 23 of the storage container 2 using the magnetic force of a magnet which rotates. Therefore, the width of the storage container 2 can be increased, thus increasing the capacity with which screws S are contained in the storage container 2.

[Scooping Unit 3]

The general construction of the scooping unit 3 of the second embodiment remains the same as that of the first embodiment, therefore some explanations thereof will be omitted. As shown in FIGS. 9 and 10, the scooping unit 3 of the second embodiment is disposed on the outer surface of the rear plate 23 of the storage container 2.

The scooping unit 3 includes a drive unit which has a drive motor 311 and rotates a magnet rotating unit 32 in one direction (in a counterclockwise direction of FIG. 9). The drive motor 311 is provided on the front surface of the front plate (not shown) of the storage container 2. An output shaft 312 of the drive motor 311 extends to the rear plate 23 of the storage container 2. A rotary cam 313 and a pulley 314 are provided on the output shaft 312. A drive belt 315 is wrapped over the pulley 314 of the output shaft 312 and a pulley 321 of the magnet rotating unit 32.

The pulley 321 is integrally provided on a first end of a rotating shaft 322 of the magnet rotating unit 32. A second end of the rotating shaft 322 is rotatably supported by a bearing 343 (refer to FIG. 4 of the first embodiment) which is installed on the rear plate 23 of the storage container 2. As shown in FIG. 4 (of the first embodiment), a magnet mounting arm 34 and an arm support 35 which supports the magnet mounting arm 34 are installed between the bearing 343 and the pulley 321. The arm support 35 has opposite planar parts 352 which are formed in a circumferential part 351 thereof, and which are in detail formed by cutting off diametrically opposite portions of the circumferential part 351. Two arm bearings 353 are respectively installed in the planar parts 352. The magnet mounting arm 34 has two rotating arm plates 341. Each rotating arm plate 341 has an arm hinge pin 342. The arm hinge pins 342 of the rotating arm plates 341 are rotatably inserted into the corresponding arm bearings 353, so that the magnet mounting arm 34 can be rotatably supported by the arm support 35.

As such, the magnet mounting arm 34 is mounted to the arm support 35 through the arm hinge pins 342 of the rotating arm plates 341 so as to be rotatable around the arm hinge pin 342 in the direction parallel to the rotating shaft 322 of the circumferential part 351 (in other words, the magnet mounting arm 34 is provided so as to be rotatable in the direction in which it is moved away from or is brought into contact with the rear plate 23). Furthermore, the magnet 36 is mounted to the distal end of the magnet mounting arm 34. A magnet guide roller 343 is provided between the magnet 36 and the arm hinge pins 342 such that the magnet rotating unit 32 can smoothly rotate around the rotating shaft 322.

As shown in FIGS. 4 and 5 of the first embodiment, the magnet guide roller 343 has a roller shaft 346. Furthermore, a pair of roller mounting plates 344 is perpendicularly provided between the rotating arm plates 341. Bearings 345 are respectively provided in the roller mounting plates 344. The roller shaft 346 of the magnet guide roller 343 is rotatably supported by the bearings 345. The magnet guide roller 343 rotates around the rotating shaft 322 along a circular trajectory.

The magnetic force of the magnet 36 attracts the screws S which are made of metal and are in the storage container 2. The screws S that are attracted to the magnet 36 are scooped up by the rotation of the magnet 36. Here, the magnet 36 is provided on the distal end of the magnet mounting arm 34 which rotates, such that the magnetic force thereof can be applied to the screws S in the storage container 2.

Furthermore, a separation rail 37 is provided on the trajectory along which the magnet guide roller 343 rotates. The separation rail 37 constitutes a magnet spacing part 33 which functions to move the magnet 36 away from the rear plate 23. As shown in FIG. 6, the separation rail 37 has a magnetic force application range X1, transition ranges X2 and X4 and a separation range X3. In this embodiment, the magnetic force application range X1 of the separation rail 37 is formed on the surface of the rear plate 23. The separation rail 37 includes a planar rail part 371 which has a semicircular shape and forms the separation range X3, and inclined parts 372 and 372 which extend from both ends of the planar rail part 371 and form the transition ranges X2 and X4. Of course, in consideration of a problem, such as abrasion of the rear surface 23, the separation rail 37 may be a circular rail which integrally has a thin planar rail part (depressed part) 374, a thick planar rail part 371 and inclined parts 372 and 373 to form a contiguous structure. In this case, the thin planar rail part 374 defines the magnetic force application range X1.

That is, the magnet spacing part 33 includes the magnet guide roller 343 which is provided on the rotating arm plates 341, and a magnet guide rail which is the separation rail 37 for guiding the magnet guide roller 343. The magnet guide rail forms a circular trajectory. The circular trajectory is defined by a thick block part which is the planar rail part 371 having an arc shape, the inclined parts 372 and 373 and the outer surface of the rear plate 23. As shown in FIGS. 9 and 10, when the magnet guide roller 343 moves on the outer surface of the rear plate 23, screws S which have gathered at a position adjacent to the rear plate 23 in the semi-cylindrical receptacle 281 of the storage container 2 are attracted by the magnetic attractive force of the magnet 36 mounted to the rotating arm plates 341 and are moved upwards along with the magnet 36. Thus, the screws S are scooped up to the upper portion of the inner surface of the rear plate 23. When the magnet guide roller 343 moves onto the planar rail part 371 via the inclined part 372, the magnet 36 is moved away from the outer surface of the rear plate 23. Then, the attractive force of the magnet 36 with respect to the screws S in the storage container 2 is weakened, so that the screws S are dropped onto the guide plate 29 (within a range Z2 designated by the shaded portion of FIG. 10). The guide plate 29 has a V-shaped cross-section and the entirety thereof is inclined downwards towards the carrying unit 4. The guide plate 29 temporarily receives screws S dropped from the scooping unit 3 and guides the screws S into the insert rail groove 421 of the carrying unit 4.

After the scooping unit 3 drops the screws S onto the carrying unit 4, the magnet guide roller 343 passes through the inclined part 373 and then moves onto the outer surface of the rear plate 23 again.

In the second embodiment, because not only the guide plate 29 is provided in the storage container 2 but also the scooping unit 3 is provided on the rear plate 23, screws S can be dropped just above the insert rail groove 421. Therefore, the operation of inserting the screws S into the insert rail to groove 421 can be facilitated.

Furthermore, the rear plate 23 is made of stainless steel which is nonmagnetic material. The screws S are objects to be carried and are magnetic substances. Therefore, the magnet 36 always attracts the screws S towards the rear plate 23. Furthermore, in this embodiment, although the rear plate 23 has been illustrated as being made of nonmagnetic stainless steel, other sidewalls of the storage container may also be made of stainless steel. In addition, the sidewalls of the storage container may be made of another material, as long as it is a nonmagnetic material, for example, glass, synthetic resin, etc., in the same manner as that of the first embodiment.

[Carrying Unit (4, Guide Rail Unit)]

Although the guide rail unit 4 of the carrying unit of the second embodiment will be explained below, because the construction of the guide rail unit 4 is almost the same as that of the first embodiment disclosed in [Patent document 2] stated above, only constructions different therebetween will be explained. Unlike the first embodiment, the second embodiment has neither the screw receiving part 43 for guiding screws S to the center of the rail part 42 nor the V-shaped receiving wings 431a and 431b. In place of them, the guide plate 29 is mounted to the rear plate 23 to guide screws S towards the center of the rail part 42 and drop the screws S thereonto. The guide plate 29 has a shape in which the width thereof is reduced towards the center of the carrying unit 4, so that screws S which are not inserted into the insert rail groove 421 are dropped into the lower part of the storage container 2 and thus do not interfere with subsequent scooped-up screws S being inserted into the insert rail groove 421 of the guide rail unit 4.

Furthermore, the general construction of the guide rail unit 4 except for the above-mentioned construction remains the same as that of the first embodiment, therefore detailed explanation will be omitted.

[Brush Rotating Unit 5, Discharge Unit 6]

The brush rotating unit 5 also has the same basic construction as that of the first embodiment, except for a brush 51 and a drive mechanism for rotating a rotating shaft 52.

The drive mechanism for rotating the rotating shaft 52 will be explained below. An elliptical rotary cam 316 is provided on the output shaft 312 of the drive motor 311. A link lever 3161 is moved upwards and downwards by the elliptical rotary cam 316 through a pressure contact roller 31611 which is provided on the lower end of the link lever 3161. The upper end of the link lever 3161 is coupled to a first end of a rotary lever 3163. The rotary lever 3163 is rotatably supported around a rotary shaft 3162. A slot 3165 is formed through the first end of the rotary lever 3163. A movable pin 3164 which is provided on the upper end of the link lever 3161 is inserted into the slot 3165 of the rotary lever 3163, so that the linear movement of the link lever 3161 is transmitted to the rotary lever 3163 through the movable pin 3164 to rotate the rotary lever 3163. A second end of the rotary lever 3163 has an arc shape having the rotary shaft 3162 at a center thereof. Gear teeth are formed on the circumferential edge of the second end of the rotary lever 3163. That is, the second end of the rotary lever 3163 forms an arc-shaped gear 3166. Furthermore, a gear 59 is provided on the rotating shaft 52 of the brush 51. The gear 59 engages with the arc-shaped gear 3166 of the rotary lever 3163. Thus, when the arc-shaped gear 3166 rotates, the brush 51 sweeps the head parts S2 of the screws S that are inserted into the insert rail groove 421 to drop screws S that are not correctly disposed in the insert rail groove 421 into the storage container 2 again. The general construction of the brush rotating unit 5 notwithstanding the above-mentioned construction remains the same as that of the brush rotating unit 5 of the first embodiment, therefore further explanation will be omitted.

As such, in the second embodiment, screws S are discharged in line to the outside of the apparatus by the operation of the above-mentioned components. Meanwhile, the discharge unit (not shown) of the second embodiment has the same construction as that of the discharge unit 6 of the first embodiment, therefore further explanation is deemed unnecessary.

As described above, in the same manner as the first embodiment, the second embodiment of the present invention is operated in such a manner that the screws S are scooped up from the lower part of the storage container 2 by the magnetic force of the magnet 36 which rotates. Therefore, the depth of the storage container 2 can be increased, thus increasing the capacity with which screws S or the like, for example, metal rivets or tacks, are contained in the storage container 2. In particular, in the second embodiment, because the scooping unit 3 is installed on the rear plate 23 of the storage container 2, the width of the storage container 2 can be increased compared to that of the first embodiment. Hence, the frequency with which screws S are input into the storage container can be reduced.

Furthermore, the magnet 36 is provided outside the storage container 2. The magnet 36 scoops up an appropriate amount of screws S from the lower part of the storage container 2 using magnetic force. The screws S that are scooped up are dropped onto the guide plate 29 of the guide rail unit 4 by moving the magnet 36 away from the rear plate 23 of the storage container 2 above the guide rail unit 4. Therefore, in the conventional technique which is operated in such a manner as to reciprocate the magnet, because the reciprocating unit easily becomes worn, much time is required to maintain and repair the reciprocating unit. However, in the second embodiment of the present invention, because the movement of the magnet 36 is realized by rotating, it can be smoothly operated and the probability of the apparatus malfunctioning can be markedly reduced. In addition, in the conventional technique, because the scraper is used to separate screws from the magnet, excessive force may be applied to the screws, damaging the screws. As well, the scraper also easily becomes worn. Thus, replacement or repair of the scraper is frequently required. However, in the second embodiment of the present invention, the operation of dropping screws on the guide rail unit 4 can be smoothly conducted in such a way as to move the magnet 36 away from the surface of the rear plate 23 and reduce the intensity of the magnetic force applied to the screws. Hence, it is not required to apply a separate external force to the screws S to remove them from the magnet 36. Thus, the screws S can be prevented from becoming damaged, and the apparatus can also be prevented from becoming worn. Moreover, the present invention is provided with the brush rotating unit 5. Therefore, screws S or the like can be easily arranged in line by the brush rotating unit 5, so that the screws S can be reliably discharged one after another.

Third Embodiment

Hereinafter, an apparatus for feeding screws according to a third embodiment of the present invention will be described in detail with reference to the attached drawings.

Although the screw feeding apparatus according to the third embodiment uses the scooping unit 3 of the second embodiment, a parallel roller unit is used as a carrying unit, unlike the first or second embodiment using the guide rail unit having the guide groove as the carrying unit.

[Carrying Unit (Parallel Roller Unit 7), Discharge Unit 8]

Figure 11:
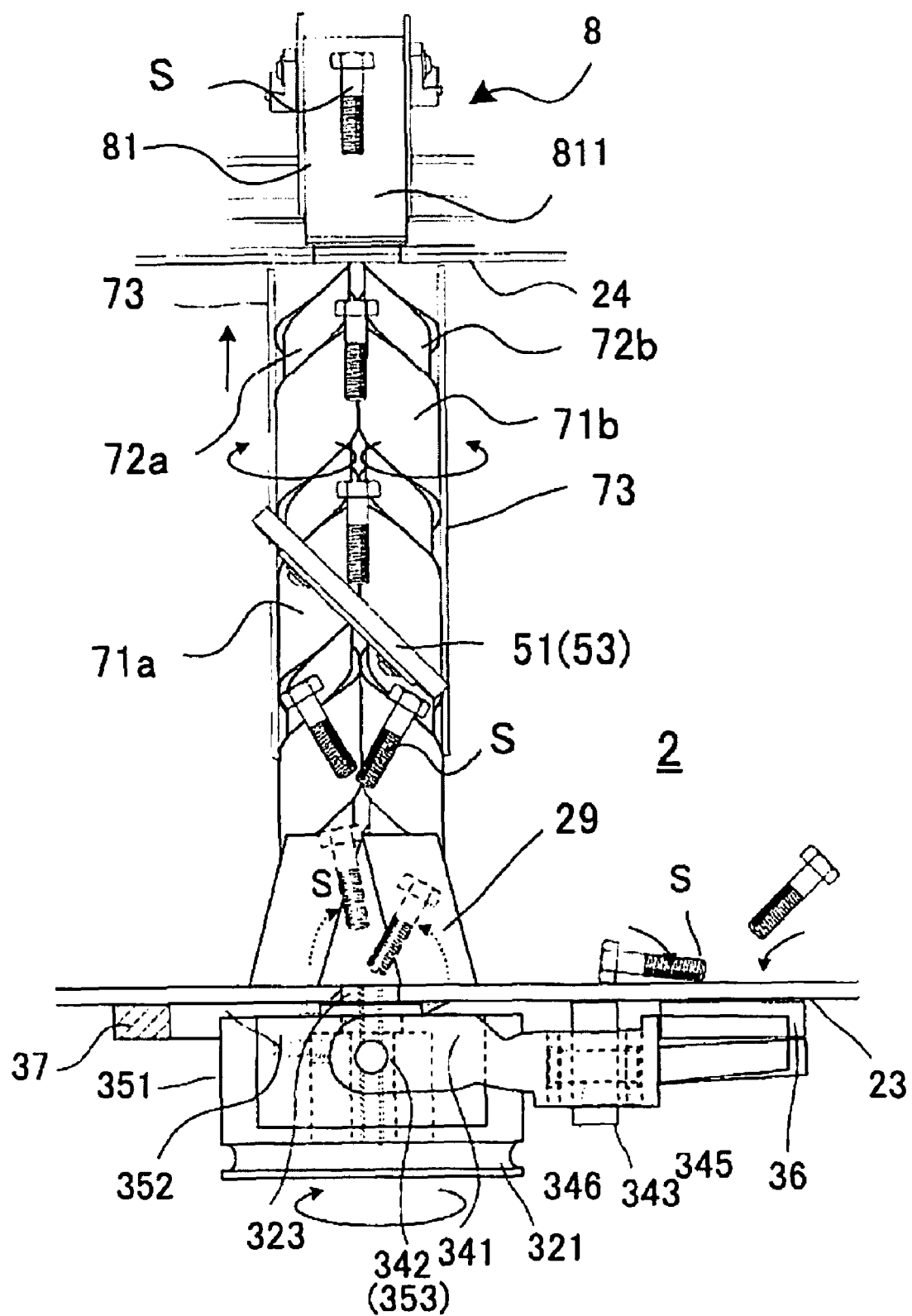
FIG. 11 is a plan view illustrating a critical part of an apparatus for feeding screws, according to a third embodiment of the present invention.

As shown in FIG. 11, the scooping unit 3 is provided on an outer surface of a rear plate 23 of a storage container 2 in the same manner as that of the second embodiment. In addition, the construction of the scooping unit 3 is the same as that of the first embodiment. Therefore, detailed explanation of the scooping unit 3 of the third embodiment will be omitted.

In the third embodiment, a guide plate 29 is installed on the inner surface of the rear plate 23. The guide plate 29 temporarily receives screws S dropped from the scooping unit 3 and guides the screws S to the center of carrying rollers 71a and 71b of the carrying unit 7.

The carrying unit using the parallel roller unit 7 includes the carrying rollers 71a and 71b which are parallel to each other and respectively have spiral grooves 72a and 72b which correspond to each other to form a symmetrical structure. The carrying rollers 71a and 71b rotate in opposite directions. Due to the above-mentioned construction, when the carrying rollers 71a and 71b rotate, the spiral grooves 72a and 72b rotate along with the carrying rollers 71a and 71b as if they linearly move along the surfaces of the carrying rollers 71a and 71b in the direction in which the screws S are carried. In the junction between the carrying rollers 71a and 71b, head parts or front ends of the screws S are held by the edges of the spiral grooves 72a and 72b, so that when the carrying rollers 71a and 71b rotate, the screws S are carried along the spiral grooves 72a and 72b. Here, screws S that are not correctly held by the spiral grooves 72a and 72b at the junction between the carrying rollers 71a and 71b are removed from the carrying rollers 71a and 71b by a brush 51 or a roller guide 73 and then dropped into the storage container 2 again. Meanwhile, the screws S that are correctly held by the spiral grooves 72a and 72b of the carrying rollers 71a and 71b are guided to a slide path 811 of a slider 81 of a discharge unit 8 and then discharged to the outside in order.

As described above, the screw feeding apparatus according to the third embodiment of the present invention not only has the same operation and effects as those of the first or second embodiment but also may be used to feed relatively large substances so long as the substances are made of magnetic metal even if they have no head parts. In other words, the third embodiment may be used as an apparatus for feeding parts which is superior in terms of compatibility.

Furthermore, the present invention is not limited to the above-mentioned embodiments as long as it does not depart from the scope and spirit of the invention, of course. In addition, partial constructions of the first through third embodiments may be combined with each other. For example, in the first embodiment, the parallel roller unit according to the third embodiment may be used as the carrying unit of the first embodiment. In this case, the guide plate for guiding screws to the roller unit may be provided.

Moreover, because the magnet is used to scoop up screws, the present invention can also be used to feed not only screws but also tacks, rivets or the like having shapes similar to screws, so long as they are magnetic substances.

What is claimed is:

1. An apparatus for feeding screws, comprising: a storage container containing the screws therein; a scooping unit scooping up the screws from a lower part of the storage container; a carrying unit receiving the screws scooped up by the scooping unit and carrying the screws; and a discharge unit discharging the screws carried by the carrying unit to an outside, wherein the discharge unit is installed ahead of the storage container, and the scooping unit comprises: a rotating arm rotating on an outer wall of the storage container; and a magnet fastened to a front end of the rotating arm, and the carrying unit comprises a screw receiving part, wherein the rotating arm rotates on the outer wall of the storage container from a lower portion thereof to an upper portion thereof to scoop up the screws contained in the storage container using an attractive magnetic force of the magnet and loads the screws onto the screw receiving part of the carrying unit, and the scooping unit further comprises a magnet spacing part provided on the outer wall of the storage container, the magnet spacing part moving the magnet of the rotating arm away from the outer wall of the storage container, so that when the magnet is moved away from the outer wall of the storage container at the upper portion of the storage container, the attractive force of the magnet to the screws is reduced, thus dropping the screws onto the screw receiving part of the carrying unit.

2. The apparatus as set forth in claim 1, wherein the scooping unit is provided on a sidewall of the storage container which is parallel to a direction in which the screws are being carried by the carrying unit.

3. The apparatus as set forth in claim 1, wherein the scooping unit is provided on a rear wall of the storage container which is perpendicular to a direction in which the screws are being carried by the carrying unit.

4. The apparatus as set forth in claim 1, wherein the carrying unit comprises a guide rail unit, wherein the guide rail unit comprises:
 a rail to guide the screws from an inside of the storage container to the outside thereof, the rail having therein an insert rail groove into which shank parts of the screws are inserted such that head parts of the screws are supported on inner edges of the rail that define the insert rail groove therebetween; and
 an inertial force applying unit vibrating the rail forwards and backwards to apply inertial force to the screws inserted into the insert rail groove in the direction in which the screws are discharged.

5. The apparatus as set forth in claim 2, wherein the carrying unit comprises a guide rail unit, wherein the guide rail unit comprises:
 a rail to guide the screws from an inside of the storage container to the outside thereof, the rail having therein an insert rail groove into which shank parts of the screws are inserted such that head parts of the screws are supported on inner edges of the rail that define the insert rail groove therebetween; and
 an inertial force applying unit vibrating the rail forwards and backwards to apply inertial force to the screws inserted into the insert rail groove in the direction in which the screws are discharged.

6. The apparatus as set forth in claim 3, wherein the carrying unit comprises a guide rail unit, wherein the guide rail unit comprises:
 a rail to guide the screws from an inside of the storage container to the outside thereof, the rail having therein an insert rail groove into which shank parts of the screws are inserted such that head parts of the screws are supported on inner edges of the rail that define the insert rail groove therebetween; and
 an inertial force applying unit vibrating the rail forwards and backwards to apply inertial force to the screws inserted into the insert rail groove in the direction in which the screws are discharged.

7. The apparatus as set forth in claim 1, wherein the carrying unit comprises a parallel roller unit, wherein the parallel roller unit comprises a pair of rollers provided parallel to each other, the rollers rotating in opposite directions, with spiral grooves respectively formed in the rollers, the spiral grooves extending in directions opposite to each other such that when the rollers rotate, the spiral grooves move on upper surfaces of the rollers in appearance in the direction in which the screws are discharged, so that the rollers guide the screws, head parts or ends of which are inserted into the spiral grooves, from an inside of the storage container to the outside thereof.

8. The apparatus as set forth in claim 2, wherein the carrying unit comprises a parallel roller unit, wherein the parallel roller unit comprises a pair of rollers provided parallel to each other, the rollers rotating in opposite directions, with spiral grooves respectively formed in the rollers, the spiral grooves extending in directions opposite to each other such that when the rollers rotate, the spiral grooves move on upper surfaces of the rollers in appearance in the direction in which the screws are discharged, so that the rollers guide the screws, head parts or ends of which are inserted into the spiral grooves, from an inside of the storage container to the outside thereof.

9. The apparatus as set forth in claim 3, wherein the carrying unit comprises a parallel roller unit, wherein the parallel roller unit comprises a pair of rollers provided parallel to each other, the rollers rotating in opposite directions, with spiral grooves respectively formed in the rollers, the spiral grooves extending in directions opposite to each other such that when the rollers rotate, the spiral grooves move on upper surfaces of the rollers in appearance in the direction in which the screws are discharged, so that the rollers guide the screws, head parts or ends of which are inserted into the spiral grooves, from an inside of the storage container to the outside thereof.

10. The apparatus as set forth in claim 1, wherein the magnetic spacing part comprises:
 a guide roller installed on the rotating arm; and
 a guide rail, comprising: an arc-shaped thick block part; inclined parts; and a depressed part, so that when the guide roller moves on the depressed part, the magnet of the rotating arm attracts the screws using magnetic force, and when the guide roller moves onto thick block part via the corresponding inclined part, the magnet is moved outwards away from the outer wall of the storage container to remove the screws from the magnet.

11. The apparatus as set forth in claim 2, wherein the magnetic spacing part comprises:
 a guide roller installed on the rotating arm; and
 a guide rail, comprising: an arc-shaped thick block part; inclined parts; and a depressed part, so that when the guide roller moves on the depressed part, the magnet of the rotating arm attracts the screws using magnetic force, and when the guide roller moves onto thick block part via the corresponding inclined part, the magnet is moved outwards away from the outer wall of the storage container to remove the screws from the magnet.

12. The apparatus as set forth in claim 3, wherein the magnetic spacing part comprises:
 a guide roller installed on the rotating arm; and
 a guide rail, comprising: an arc-shaped thick block part; inclined parts; and a depressed part, so that when the guide roller moves on the depressed part, the magnet of the rotating arm attracts the screws using magnetic force, and when the guide roller moves onto thick block part via the corresponding inclined part, the magnet is moved outwards away from the outer wall of the storage container to remove the screws from the magnet.

13. The apparatus as set forth in claim 4, wherein the magnetic spacing part comprises:
 a guide roller installed on the rotating arm; and
 a guide rail, comprising: an arc-shaped thick block part; inclined parts; and a depressed part, so that when the guide roller moves on the depressed part, the magnet of the rotating arm attracts the screws using magnetic force, and when the guide roller moves onto thick block part via the corresponding inclined part, the magnet is moved outwards away from the outer wall of the storage container to remove the screws from the magnet.

14. The apparatus as set forth in claim 5, wherein the magnetic spacing part comprises:
a guide roller installed on the rotating arm; and
a guide rail, comprising: an arc-shaped thick block part; inclined parts; and a depressed part, so that when the guide roller moves on the depressed part, the magnet of the rotating arm attracts the screws using magnetic force, and when the guide roller moves onto thick block part via the corresponding inclined part, the magnet is moved outwards away from the outer wall of the storage container to remove the screws from the magnet.

15. The apparatus as set forth in claim 6, wherein the magnetic spacing part comprises:
a guide roller installed on the rotating arm; and
a guide rail, comprising: an arc-shaped thick block part; inclined parts; and a depressed part, so that when the guide roller moves on the depressed part, the magnet of the rotating arm attracts the screws using magnetic force, and when the guide roller moves onto thick block part via the corresponding inclined part, the magnet is moved outwards away from the outer wall of the storage container to remove the screws from the magnet.

16. The apparatus as set forth in claim 7, wherein the magnetic spacing part comprises:
a guide roller installed on the rotating arm; and
a guide rail, comprising: an arc-shaped thick block part; inclined parts; and a depressed part, so that when the guide roller moves on the depressed part, the magnet of the rotating arm attracts the screws using magnetic force, and when the guide roller moves onto thick block part via the corresponding inclined part, the magnet is moved outwards away from the outer wall of the storage container to remove the screws from the magnet.

17. The apparatus as set forth in claim 8, wherein the magnetic spacing part comprises:
a guide roller installed on the rotating arm; and
a guide rail, comprising: an arc-shaped thick block part; inclined parts; and a depressed part, so that when the guide roller moves on the depressed part, the magnet of the rotating arm attracts the screws using magnetic force, and when the guide roller moves onto thick block part via the corresponding inclined part, the magnet is moved outwards away from the outer wall of the storage container to remove the screws from the magnet.

18. The apparatus as set forth in claim 9, wherein the magnetic spacing part comprises:
a guide roller installed on the rotating arm; and
a guide rail, comprising: an arc-shaped thick block part; inclined parts; and a depressed part, so that when the guide roller moves on the depressed part, the magnet of the rotating arm attracts the screws using magnetic force, and when the guide roller moves onto thick block part via the corresponding inclined part, the magnet is moved outwards away from the outer wall of the storage container to remove the screws from the magnet.

\* \* \* \* \*